United States Patent [19]

Kopf

[11] Patent Number: 4,997,464

[45] Date of Patent: Mar. 5, 1991

[54] DEAERATION APPARATUS

[76] Inventor: Henry B. Kopf, 108 Coatbridge Cir., Cary, N.C. 27511

[21] Appl. No.: 498,353

[22] Filed: Mar. 23, 1990

[51] Int. Cl.$^5$ ............................................ B01D 19/00
[52] U.S. Cl. ...................................... 55/170; 55/192; 55/274
[58] Field of Search ....................... 55/38, 52, 55, 159, 55/164, 169, 170, 189, 192, 274

[56] References Cited

U.S. PATENT DOCUMENTS

| | | | |
|---|---|---|---|
| Re. 27,882 | 1/1974 | Burnham, Sr. | 55/55 X |
| 1,355,617 | 10/1920 | Niemeyer | 55/274 X |
| 2,195,898 | 4/1940 | Newton | 55/170 |
| 2,214,368 | 9/1940 | Greensfelder et al. | 55/55 X |
| 2,228,401 | 1/1941 | Pressler | 55/170 |
| 2,296,543 | 9/1942 | Steen et al. | 55/170 X |
| 3,688,473 | 9/1972 | Brown | 55/38 |
| 3,747,302 | 7/1973 | Frayssinoux | 55/170 X |
| 3,778,971 | 12/1973 | Granger et al. | 55/159 |
| 4,475,932 | 10/1984 | Hull et al. | 55/170 |
| 4,516,984 | 5/1985 | Warner et al. | 55/189 X |
| 4,602,923 | 7/1986 | Bernstein | 55/55 X |
| 4,614,527 | 9/1986 | Reimann | 55/170 |
| 4,643,713 | 2/1987 | Viitala | 604/4 |
| 4,729,773 | 3/1988 | Shirato et al. | 55/159 X |
| 4,734,269 | 3/1988 | Clarke et al. | 422/310 |
| 4,746,335 | 5/1988 | Reimann et al. | 55/170 |
| 4,787,921 | 11/1988 | Shibata et al. | 55/52 X |

FOREIGN PATENT DOCUMENTS

| | | | |
|---|---|---|---|
| 2907188 | 8/1979 | Fed. Rep. of Germany | 55/159 |
| 797718 | 1/1981 | U.S.S.R. | 55/159 |

*Primary Examiner*—Robert Spitzer
*Attorney, Agent, or Firm*—Steven J. Hultquist

[57] ABSTRACT

A deaeration apparatus for removing entrained gases from liquids, comprising a degas vessel, which is baffled to enhance degasification. As gas removed from the liquid collects in an upper part of the degas vessel, the pressure in the vessel increases, lowering the liquid level therein. A sensing mechanism provides a liquid level signal to a controller which opens a valve at a vent port at the upper portion of the degas vessel when a predetermined liquid level is reached, whereby gas is vented from the vessel. The gas venting causes pressure in the degas vessel to decrease, thereby allowing the liquid level to again rise to a selected liquid level at which the level sensing mechanism signal causes the controller to close the vent valve.

9 Claims, 2 Drawing Sheets

DEAERATION APPARATUS

BACKGROUND OF THE INVENTION

1. Field of the Invention

This invention relates generally to devices for removing gases from liquids. The device can efficaciously be used as a part of a chromatography system for removing gases from elution solutions, although its application is not so restricted.

2. Description of the Prior Art

In many industrial systems or research processes, it is necessary to remove gases from a liquid to optimize performance of the system or process. For example, in liquid chromatography, elution solutions frequently contain entrained gas bubbles and dissolved gases after passing through an absorption column. Prior to analysis of the elution solution, it is beneficial to deaerate the solution. Liquids requiring degasification may be at ambient pressure, at a positive pressure, or at a subatmospheric pressure.

A variety of devices have been employed for the purposes of removing gas bubbles from liquids. For example, U.S. Pat. No. 4,643,713 teaches a venous reservoir for use in a blood treatment system, such as might be employed during cardiopulmonary surgery for removing gas bubbles from blood being recirculated to the patient undergoing surgery. The device primarily consists of a vented chamber constructed of flexible materials through which the blood flows. Blood enters one end of the chamber and exits at the opposite end of the chamber. As the blood flows into the chamber its velocity decreases and it expands rapidly, allowing gas bubbles to migrate out of the liquid to the vent. The vent is positioned on the upper portion of the chamber into which the blood flows to allow the gas bubbles that are removed from the blood to pass out of the chamber to the atmosphere. The chamber is shaped to assist in the collection of gas bubbles at its top and to direct fluid flow to the outlet. The chamber does not, however, have any interior baffling or flow-directing means, and the vent control is manually operated. The chamber is normally continually filled with blood and there is no sensing or automatic control of the vent valve relative to the blood level in the chamber.

A related device is taught in U.S. Pat. No. 4,734,269, relating to a venous reservoir bay with an integral high-efficiency bubble removal system. This device also has application in blood treatment systems to remove gas bubbles. In addition to the liquid flowing into a chamber where it can expand and its flow rate can slow, this device incorporates a filter system through which the blood flows. The filter device assists in the removal of the entrained gases, which are then vented through a vent fitting located at the upper portion of the chamber. Additionally, another vent is located at the upper portion of the chamber, but outside the filter device. Normal flow through the device results in blood flowing into the chamber, up and through the filter device, and then exiting the chamber at the opposite end. The device is provided with a bypass flow channel to allow the liquid to continue flowing should the filter become clogged.

In some applications, such as liquid chromatography, it is not desirable to pass the liquid that one desires to deaerate through a filter mechanism, as the filtering may remove or alter the composition of the elution liquid. Additionally, filtering typically requires that a greater pressure head be used to urge the liquid through the deaeration device, particularly at higher flow rates, and depending on the pressures, temperatures, and the characteristics of the liquids involved, cleaning or replacement of filters can be difficult and time consuming.

In some situations the pressures involved in the systems requiring deaeration make it impracticable to have a system continuously vented to atmospheric pressure, as is taught by the above-referenced patents, as the pressure in the system would cause the liquid itself to pass through the vent connection.

It is an object of the present invention to provide an improved deaeration apparatus.

It is a further object of this invention to provide a deaeration apparatus that can efficaciously deaerate liquids over a range of pressures, and that can maintain the pressure in the deaeration apparatus in a selected range.

Another object of the invention is to provide an apparatus that will remove gas bubbles and also dissolved gases.

Other objects and advantages will be more fully apparent from the ensuing disclosure and appended claims.

SUMMARY OF THE INVENTION

The present invention relates to a deaeration apparatus. The invention is adapted to be placed into a liquid flow path in a variety of systems that may operate over a range of pressures.

The liquid to be degassed flows into a degas vessel that has an interior degas chamber. Flow within the chamber enhances the removal of the gases from the liquid by causing the gases to rise out of the liquid and collect in an upper portion of the degas chamber. Baffling in the degas chamber can be used to achieve optimal flow paths within the chamber for degassing. The liquid flowing out of the degas chamber has a substantially reduced gas content.

This liquid may then be optionally further treated, if desired, to remove additional (dissolved) gas therefrom, by passing the liquid through capillary tubes which may comprise hydrophobic hollow fiber membranes mounted in a sealed enclosure on which a vacuum is drawn. The vacuum around the outside of the capillary tubes further enhances extraction of gas, including dissolved gases, from the liquid flowing through the capillary tubes. After the liquid has flowed through the capillary tubes, it is discharged from the enclosure, and may be further processed or analyzed, as appropriate to the system.

Gases removed from the liquid flowing through the degas chamber collect in the upper portion of that chamber. As the gases collect expansion is limited by the degas vessel structure and the liquid level in the degas chamber. The limited room for expansion results in an increase in pressure, causing a consequent decrease in the liquid level in the degas chamber. A sensing mechanism for the liquid level inside the degas vessel provides input to a control mechanism for a vent valve joined in gas flow communication with a vent port on the degas vessel. The vent valve opens when the liquid level reaches a selected point; the open vent valve allows the gases in the upper part of the degas chamber to flow to the atmosphere or other suitable system for disposal. As the gases are vented the pressure in the degas chamber decreases, thereby allowing the liquid level to rise. At a selected level, the sensing mechanism signal directed to the control mechanism causes the vent valve to close, thereby preventing the liquid level from rising to the level where it would be discharged through the vent valve.

The degas chamber may suitably contain baffles which cause flow direction changes in the liquid passing through the degas chamber. Such changes in the flow direction facilitate gas bubbles rising out of the liquid and collecting in the upper portion of the chamber.

Additionally, the degas vessel may be equipped with a drain valve through which the chamber can be drained for disassembly or maintenance.

The degas vessel can be constructed to provide means for visually ascertaining the liquid level in the degas vessel.

The apparatus of the invention may be readily incorporated into a chromatography or other system requiring a deaeration device, to provide effective degasification in systems operating at ambient pressure, under a positive pressure, or under a vacuum.

Other aspects and features of the invention will be more fully apparent from the ensuing disclosure and claims.

DETAILED DESCRIPTION OF THE INVENTION, AND PREFERRED EMBODIMENTS THEREOF

Figure 1:
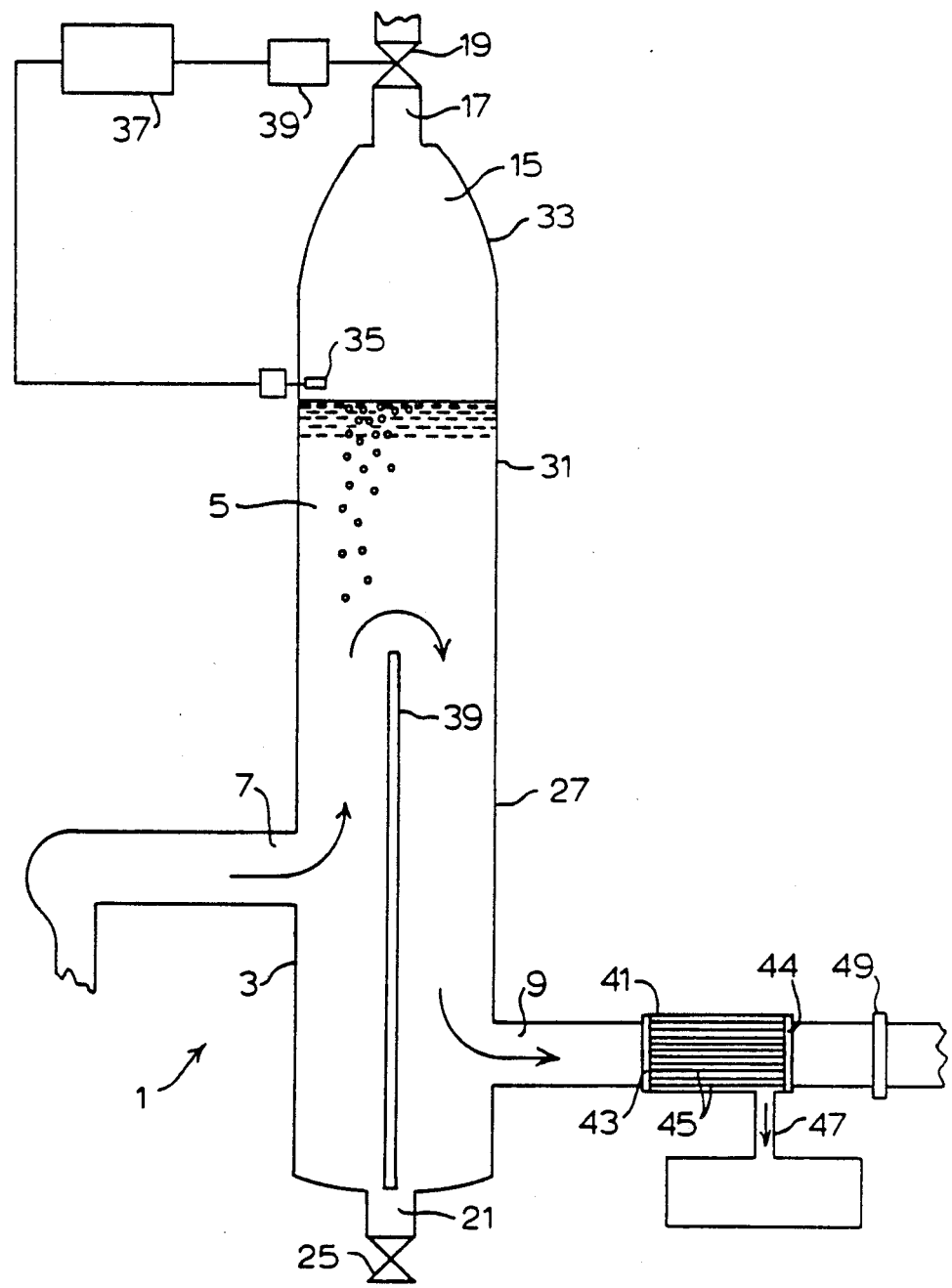
FIG. 1 is a schematic representation of an illustrative deaeration apparatus according to one embodiment of the present invention.

Referring now to the drawings, FIG. 1 shows a schematic representation of a deaeration apparatus 1 for removing gases from liquids which flow through the apparatus. The liquid to be degassed is directed to the inlet port 7 of the degas vessel 3. Degassing occurs as the liquid flows from inlet port 7 through the interior chamber 5 to outlet port 9. Gases removed from the liquid collect in interior volume 15 of the dome assembly 33 of degas vessel 3. Vent port 17 is positioned on dome assembly 33 to communicate with interior volume 15 to allow gases removed from the liquid to exit the degas vessel 3. Vent port 17 preferably communicates with the uppermost portion of interior volume 15 to provide maximum venting. Vent valve 19 is positioned downstream of vent port 17 to control flow through the vent port.

Degas vessel 3 may also comprise a drain port 21, in flow communication with a lower portion of interior chamber 5. Drain valve 25 is positioned on the drain port 21 as shown, to control flow therethrough. Drain valve 25 is typically closed during normal degas operations so that all liquid flowing through the degas vessel 3 enters through inlet port 7 and exits through outlet port 9. Drain valve 25 can be opened to drain degas vessel 3 as may be required for maintenance or disassembly of the apparatus.

Liquid level sensing means 35 ascertains the level in interior chamber 5 of the liquid-gas interface. Liquid level sensing means 35 is in turn used to provide input to controller 37 which controls actuating means 39 to operate vent valve 19.

Sensing means 35 can be of any suitable type for delivering a signal indicative of the liquid level in the interior chamber 5 over a selected range. Such liquid level sensing means may be, by way of example and not limitation, a proximity switch, a float switch, or other mechanical, electrical, or electronic means. Such device is in turn attached to or mounted on degas vessel 3 in a suitable manner to maintain the integrity of degas vessel 3 to contain the liquids and gases at the pressures and temperatures required by the system on which the deaeration apparatus is used.

Controller 37 is conventional and known in the art and can be of any suitable type to receive the input from sensing device 35 and use that input to control the actuating means 39 of vent valve 19 so that the liquid level in the interior chamber 5 is maintained within a selected range. Selection of a liquid level operating range would typically be influenced by factors such as keeping liquid level low enough to prevent liquid from flowing through the vent port, keeping liquid level high enough to provide sufficient liquid flow for effective removal of gas, and to prevent building up sufficient back pressure in interior chamber 5 to adversely affect system flow rate or pressure.

Vent valve actuator 39 is conventional and known in th art and can be of any suitable type, such as an electrical, pneumatic, or hydraulic actuating device.

A useful control system, comprising sensing means 35, controller 37, vent valve actuator 39, and vent valve 19, which has been usefully employed in the practice of the invention, includes an Omron Capacitive Proximity Switch (E2K-E25MEl), an Omron ID211 Input Module, and an Omron Programmable Controller (SYS-MAC C200H), all commercially available from Omron Electronics, Inc. (Schaumberg, IL), in conbination with a ¾Triclover Clamp Piston Actuated Diaphragm Valve (Part No. 7006-60EC5-EB), commercially available from Saunders Valve, Inc. (Houston, TX). A limit switch, such as a KSJ-T limit switch, commercially available from C & K/Unimax, Inc. (Wallingford, CT) may also be employed on the vent valve actuator to verify the open or closed position of the vent valve.

As the liquid flowing through the interior chamber 5 is degassed, the gas removed collects in interior volume 15 of the dome assembly 33. As more gas is removed from the liquid, the pressure of the collected gases in interior volume 15 increases, thereby causing the liquid level in the interior chamber 5 to move lower. When vent valve 19 is opened, the gases flow from the interior volume 15 to the atmosphere or other suitable repository. The outflow of the gas causes a pressure decrease in the interior volume 15, thereby allowing the liquid level to rise. Changes in this liquid level, detected by sensing means 35, is used to control the operation of vent valve 19.

In a preferred aspect, degasification is enhanced by providing an extended liquid flow path in the degas vessel, such as by the use of means for causing changes in direction of the flow of the liquid through the interior chamber 5 of the degas vessel 3. Changes in flow direction can be achieved by any suitable means, but an efficacious and simple mechanism for this purpose is the provision of a flow director plate 39 within the interior chamber 5. Flow director plate 39 is advantageously placed diametrically across the interior chamber 5 in a position substantially perpendicular to the flow of the liquid entering inlet port 7. Flow director plate 39 extends upwardly in interior chamber 5 to a vertical level above the inlet port 7. Consequently, liquid entering inlet port 7 must flow upwardly, across flow director plate 39, and then downwardly on the opposite side of flow director plate 39 to reach the outlet port 9. This flow path results in substantially a 90° turn in liquid flow direction upon entering the degas vessel 3, a 180° change in flow direction over the top of flow director plate 39, and a final 90° change in flow direction upon leaving the degas vessel through the outlet port. These changes in direction assist in the removal of gas bubbles entrained in the fluid, which gas bubbles tend to rise out of the fluid and collect in the interior volume 15 of the dome assembly 33.

The liquid flowing out of outlet port 9 is optionally, as shown, directed through piping or suitable tubing to a hollow fiber membrane device 41. The fluid entering the membrane device 41 flows to a header 43 from whence it travels through capillary tubes traversing the length of the membrane device to a header 44 on the opposite side of the device. The capillary tubes 45 traverse the length of membrane device 41, which provides a substantially air-tight enclosure for the capillary tubes 45 so that a vacuum may be drawn on the interior of the membrane device 41 but outside of the capillary tubes 45. The vacuum is created by connecting any appropriate vacuum-producing means to the interior of membrane device 45 via vacuum line 47. The capillary tubes 45 are preferably made of a hydrophobic material such as polypropylene with sufficient porousness to allow dissolved gases and any remaining entrained gases in the liquid to migrate out of the liquid in the capillary tubes and into the interior volume of membrane device 41 and thence to be exhausted through the vacuum line 47. Hollow fiber membrane devices which may be usefully employed in the practice of the present invention include the polypropylene hollow fiber membrane devices commercially available from Microdyn Modulbau (Wuppertal, Federal Republic of Germany), and Setec (Livermore, CA). Additionally, in the illustrative embodiment, a solids concentration monitor 49 may be placed downstream of the deaeration device to monitor gas/liquid content after deaeration. A suitable solids concentration monitor for such purpose is the Model 110 Solids Concentration Monitor, Bubble Detector Model, commercially available from Wedgewood Technology, Inc. (San Carlos, CA), as used in combination with Sensor Model AF10-07-TC available from the same manufacturer.

Figure 2:
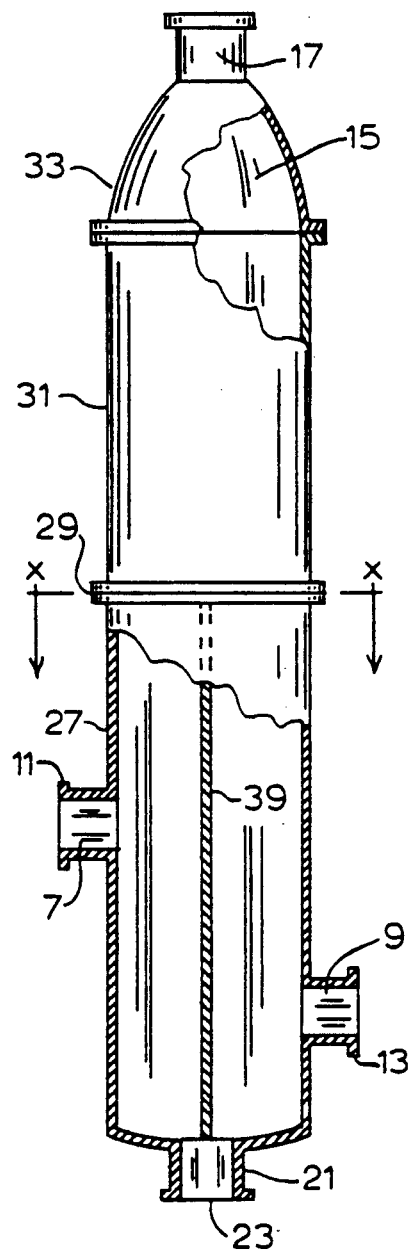
FIG. 2 is a cross-sectional elevation view of a degas chamber of a type as schematically illustrated in FIG. 1.
Figure 3:
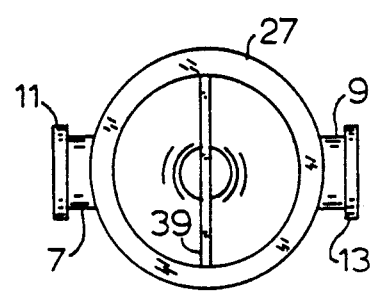
FIG. 3 is a top cross-sectional view of the degas chamber, taken along line X—X of FIG. 2.

FIGS. 2 and 3 reflect details of the construction of the degas vessel 3. Degas vessel may be fabricated of any appropriate material in one or more segments to provide the degasification effects described above. As illustrated, the degas vessel comprises a lower vessel assembly 27, an upper vessel assembly 31, and dome assembly 33. By way of example, and not limitation, lower vessel assembly 27 may be constructed of 316 L stainless steel and the flow director plate 39 may advantageously be made of 14 guage steel.

To facilitate visual inspection of the liquid level, the upper vessel assembly 31 may be made of an material of sufficient strength and transparency, such as clear polysulfone. Alternate means of visually determining liquid level may also be used, such as a sight glass, and the upper vessel assembly itself can be constructed of any suitable material. The upper vessel assembly 31 may be attached to the lower vessel assembly by any suitable attachment means such as mechanical fasteners, adhesive, or other connecting means. The dome assembly 33 similarly may be fabricated from 316L stainless steel and connected to the upper vessel assembly 31 in a fashion similar to the attachment means between the upper vessel assembly 31 and lower vessel assembly 27.

Inlet port 7 may be configured to connect to piping or tubing used in the system delivering the liquid to the deaeration assembly. Such connecting means can comprise inlet port flange 13 or other suitable means, such as fittings adapted to receive flexible tubing. Similarly, outlet port 9 can have outlet flange 11 or other suitable connecting means to attach to piping or tubing, to transport the liquid to membrane device 41.

The deaeration apparatus of this invention can be used to degas liquids that are at ambient pressure or under positive pressure. It can also be employed to degas liquids under vacuum, provided the vent port is connected to a vacuum source of negative pressure greater than that of the liquid.

As used in this application, the words "degas" and "deaerate" and variations thereof, are intended to be construed broadly and interchangeably.

Although the invention has been shown and described with reference to illustrative and preferred embodiments, it is to be understood that various modifications and substitutions may be made by those skilled in the art without departing from the spirit and scope of the present invention.

What is claimed is:

1. A deaeration apparatus for removing gases from liquids, comprising:
   an elongated, vertically extending degas vessel of substantially greater height than lateral dimension, having an interior chamber therein, with an upper end and a lower end, said upper end being configured to define an interior volume for collection and venting of gases removed from liquids flowing through the degas vessel, a horizontally aligned inlet port and a horizontally aligned outlet port at a lower portion of the vessel and in flow communication with the interior chamber, and in vertically and laterally spaced-apart relationship to one another, with the inlet port at a higher elevation than the outlet port, and laterally opposite the outlet port, to allow liquid flow through the interior chamber, a vent port communicating with the upper end of said interior chamber, with said interior chamber having a flow director plate mounted therein, extending laterally across the interior chamber, from side-to-side thereof, and vertically upwardly extending in the chamber from the lower end thereof to an upper end at a height above the inlet port, with a first side of the flow director plate facing the inlet port and a second side of the flow director plate facing the outlet port, to provide a liquid flow path therein comprising (i) a substantially 90 degree turn in liquid flow direction of liquid entering the interior chamber, from a horizontal direction to a vertically upward direction, (ii) a substantially 180 degree change in flow direction over the upper end of the flow director plate, from a vertically upward flow on the first side of the flow director plate to a vertically downward flow on the second side of the flow director plate, and (iii) a substantially 90 degree turn in flow direction from the vertically downward flow on the second side of the flow director plate disengagement of gases from the liquid;

a vent valve for controlling flow out of the degas vessel through said vent port; and means for operating said vent valve to maintain a selected liquid level in said interior chamber, comprising means for sensing liquid level in the interior chamber and generating a signal correlative thereto; and means for adjusting the vent valve in response to said signal, such that the vent valve is selectively openable by said vent valve adjusting means in response to said signal, to vent accumulated gas through the vent port and maintain a controlled liquid level in said chamber.

2. A deaeration apparatus according to claim 1, wherein said apparatus further comprises a drain port communicating with a lower portion of the interior chamber of said degas vessel and a drain valve positioned to control flow through the drain port.

3. A deaeration apparatus according to claim 1, wherein said means for adjusting the vent valve in response to said signal comprises a controller receiving the sensing signal output and an actuating means responsive to said controller for adjusting the vent valve to maintain liquid level in the interior chamber in a selected range.

4. A deaeration apparatus according to claim 3, wherein said actuating means for operation of the vent valve comprises electrical actuating means.

5. A deaeration apparatus according to claim 3, wherein said actuating means for operation of the vent valve comprises pneumatic actuating means.

6. A deaeration apparatus according to claim 1, wherein the degas vessel comprises viewing means to visually ascertain the liquid level in the interior chamber.

7. A deaeration apparatus according to claim 1, further comprising dissolved gas removal means downstream of said vessel.

8. A deaeration apparatus for removing gases from liquids, comprising:

an elongated, vertically extending degas vessel of substantially greater height than lateral dimension, having an interior chamber therein, with an upper end and a lower end, said upper end being configured to define an interior volume for collection and venting of gases removed from liquids flowing through the degas vessel, a horizontally aligned inlet port and a horizontally aligned outlet port at a lower portion of the vessel and in flow communication with the interior chamber, and in vertically and laterally spaced-apart relationship to one another, with the inlet port at a high elevation than the outlet port, and laterally opposite the outlet port, to allow liquid flow throught the interior chamber, a vent port communicating with the upper end of said interior chamber, with said interior chamber having a flow director plate mounted therein, extending laterally across the interior chamber, from side-to-side thereof, and vertically upwardly extending in the chamber from the lower end thereof to an upper end at a height above the inlet port, with a first side of the flow director plate facing the inlet port and a second side of the flow director plate facing the outlet port, to provide a liquid flow path therein comprising a substantially 90 degree turn in liquid flow direction of liquid entering the interior chamber, from a horizontal direction to a vertically upward direction, a substantially 180 degree change in flow direction over the upper end of the flow director plate, from a vertically upward flow on the first side of the flow director plate to a vertically downward flow on the second side of the flow director plate, and a substantially 90 degree turn in flow direction from the vertically downward flow on the second side of the flow director plate to a horizontal direction at the outlet port, for disengagement of gases from the liquid;

a vent valve for controlling flow out of the degas vessel through said vent port; and means for operating said vent valve to maintain a selected liquid level in said interior chamber, comprising means for sensing liquid level in the interior chamber and generating a signal correlative thereto; and means for adjusting the vent valve in response to said signal, such that the vent valve is selectively openable by said vent valve adjusting means in response to said signal, to vent accumulated gas through the vent port and maintain a controlled liquid level in said chamber;

a hollow fiber membrane device coupled in flow communication relationship with the outlet port of the degas vessel, having an inlet header, an outlet header, an air-tight enclosure therebetween, and an array of parallelly aligned capillary tubes extending between the inlet header and the outlet header in the enclosure and defining an interior volume of the enclosure outside of the capillary tubes therein; and means for imposing a negative pressure on the interior volume of the enclosure to cause dissolved gases in the liquid flowed through the capillary tube to be removed therefrom into said interior volume and from the interior volume out of the enclosure.

9. A deaeration apparatus according to claim 8, wherein the negative pressure imposing means comprise vacuum-producing suction means.

* * * * *